US012560773B2

(12) United States Patent
Wischnewski

(10) Patent No.: US 12,560,773 B2
(45) Date of Patent: Feb. 24, 2026

(54) CONTAMINATION-SAFE OPTICAL COUPLING DEVICE

(71) Applicant: RAYLASE GmbH, Wessling (DE)

(72) Inventor: Reinold Wischnewski, Utting (DE)

(73) Assignee: RAYLASE GmbH, Wessling (DE)

( * ) Notice: Subject to any disclaimer, the term of this patent is extended or adjusted under 35 U.S.C. 154(b) by 251 days.

(21) Appl. No.: 18/547,913

(22) PCT Filed: Feb. 25, 2022

(86) PCT No.: PCT/EP2022/054794
§ 371 (c)(1),
(2) Date: Aug. 25, 2023

(87) PCT Pub. No.: WO2022/184579
PCT Pub. Date: Sep. 9, 2022

(65) Prior Publication Data
US 2024/0151920 A1 May 9, 2024

(30) Foreign Application Priority Data

Mar. 1, 2021 (EP) ..................................... 21160033

(51) Int. Cl.
*G02B 6/42* (2006.01)
*G02B 6/38* (2006.01)
(52) U.S. Cl.
CPC ......... *G02B 6/4296* (2013.01); *G02B 6/4239* (2013.01); *G02B 6/3897* (2013.01)
(58) Field of Classification Search
None
See application file for complete search history.

(56) References Cited

U.S. PATENT DOCUMENTS 4,633,872 A * 1/1987 Chaffee .............. B23K 26/0604
219/121.75
5,708,745 A 1/1998 Yamaji et al.
(Continued)

OTHER PUBLICATIONS

International Search Report & Written Opinion of the International Searching Authority dated Jun. 28, 2022 for International Application No. PCT/EP2022/054794.

*Primary Examiner* — Jerry Rahll
(74) *Attorney, Agent, or Firm* — Eschweiler & Potashnik, LLC

(57) ABSTRACT

The invention refers to an optical fiber coupling device for ensuring contamination-free coupling and uncoupling of an optical fiber to a further optical component. The optical fiber coupling device comprises a lid mechanism for opening and closing an axial channel of the optical fiber coupling device. The lid mechanism comprises a driver element and a lid element. The driver element is arranged on an exterior side of a main coupling structure of the device and is movable between a first and a second position. The lid element arranged in an interior of the main coupling structure and is movable between a closed position, in which the lid element closes the axial channel, and an open position, in which the lid element exposes the axial channel. The lid element is magnetically coupled to the driver element. The invention further refers to a laser module comprising the optical fiber coupling device.

20 Claims, 8 Drawing Sheets

(56) References Cited

U.S. PATENT DOCUMENTS

| | | | |
|---|---|---|---|
| 6,866,424 B2 * | 3/2005 | Tanaka | G02B 6/3825 |
| | | | 385/55 |
| 7,418,167 B2 * | 8/2008 | Dames | G02B 6/3564 |
| | | | 385/16 |
| 2003/0181893 A1 | 9/2003 | Neuberger | |
| 2007/0206901 A1 * | 9/2007 | Bonitatibus | F21S 8/006 |
| | | | 385/48 |
| 2010/0092131 A1 | 4/2010 | Davidson et al. | |
| 2013/0220711 A1 * | 8/2013 | Beguin | G01G 7/04 |
| | | | 177/210 EM |

* cited by examiner a)

b)

c)

a)

b)

c)

a)

b)

a)

b)

CONTAMINATION-SAFE OPTICAL COUPLING DEVICE

REFERENCE TO RELATED APPLICATIONS

This Application is a National Phase entry of International Application number PCT/EP2022/054794, filed on Feb. 25, 2022, which claims the benefit of European Application number 21160033.3, filed on Mar. 1, 2021. The contents of the above-referenced Patent Applications are hereby incorporated by reference in their entirety.

FIELD OF THE INVENTION

The present invention is in the field of optical fiber connection devices. In particular, the invention refers to an optical fiber coupling device for safely establishing an optical connection and to a laser module incorporating such optical fiber coupling device.

BACKGROUND OF THE INVENTION

When optical units are coupled, for example when an optical fiber connector is connected to a receiving optical port, the optical paths of the two optical components to be connected must typically be exposed to the environment for some time. Therefore, there exists a risk that particles from the environment or debris particles resulting from mechanical abrasion during the coupling process itself may access the optical port and eventually reach and contaminate optical components arranged downstream. Such particles may for example end up on an optical lens, on a protection glass or on a deflecting mirror of the optical system. This can lead to damage or malfunction of such optical components, in particular to an alteration of their optical properties.

The risk of contamination is especially high if the optical coupling is performed in a mainly vertical orientation of the optical axis (optical feeding from above). A horizontal orientation may reduce the risk to some extent but it is not implementable in a large number of cases and fails to completely solve the problem of unwanted contamination.

For this reason, according to some solutions, the optical components affected by possible contamination are configured to be easily removable from an optical system or made accessible in some other way, so as to allow for their regular cleaning or replacement. However, due to the necessary opening of the optical system and the corresponding exposure to the environment, this represents a further possible source of contamination. When optical devices are removed for cleaning, there is always some risk of potential damage. Further, removing and cleaning processes require the optical system to be opened and hence to remain out of order for some time, which increases operational costs.

Other solutions rely on cleaning processes for cleaning the optical system using a cleaning fluid, such as compressed air or an inert gas, so as to clean eventual contaminants away from the optical components. However, such cleaning processes pose increased operating costs and pose the additional risk of uncontrolledly redistributing contaminating particles within the optical system, possibly contaminating again the same optical devices or different optical devices.

Other solutions are based on performing the coupling operation in a protected environment, for example in a so-called cleanroom. This however requires a dedicated workflow, since all components involved in the coupling process that may produce contaminant particles due to mechanical abrasion, such as connectors and the like, must be separated from the rest of the optical system and coupled outside of the cleanroom in order to prevent contamination of the rest of the optical system. This however also requires disassembling the optical system and hence increases the risk of uncontrolled contamination in the interior of the system and of loss of fine adjustments.

Therefore, there is room for technical improvement regarding the protection of an optical system from contamination when coupling light from an optical fiber into the optical system at an optical fiber coupling device through an optical fiber connector.

SUMMARY OF THE INVENTION

The invention aims at providing an optical fiber coupling device allowing to establish an optical connection between an optical fiber and a further optical component or optical system, in particular an optical module, which overcomes the technical disadvantages mentioned above, in particular by preventing contamination from entering said further optical component or system when coupling the optical fiber.

The optical fiber coupling device of the invention comprises a main coupling structure, which may for example comprise or be made of a metallic or plastic material. The main coupling structure may be substantially rotationally symmetrical around a longitudinal axis thereof. Although some structural components may break a strict rotational symmetry, the geometry of the main coupling structure may be such that it mostly exhibits such rotational geometry around its longitudinal axis.

The "axial direction" may refer in the present application to a direction parallel to the axis of rotational symmetry of the main coupling structure, i.e. may be a direction parallel to the longitudinal axis of the main coupling structure. For example, the main coupling structure may have a substantially cylindrical geometry, meaning that in a cross-sectional plane perpendicular to the axial direction, the main coupling structure may have a substantially circular cross-section.

The main coupling structure comprises an axial channel extending through the main coupling structure from a first axial end to a second axial end. The axial channel may extend substantially parallel to the axial direction of the main coupling structure. The axial channel may provide an optical path through which light can be transmitted across the optical fiber coupling device, in particular totally transmitted. The axial channel may for example define an opening in the material of the main coupling structure through which light can be transmitted. The axial channel may be filled with vacuum, air or a waveguide material. Additionally or alternatively, a waveguide such as a portion of optical fiber, may be received in the axial channel. According to some embodiments, the axial channel may have a diameter of 20 mm or less, preferably of 8 to 12 mm.

The main coupling structure further comprises a coupling mechanism for coupling an optical fiber connector thereto. The coupling mechanism is axially arranged at the first axial end of the axial channel and is configured such that, when an optical fiber connector is coupled to the coupling mechanism, light from the optical fiber connector can be transmitted through the axial channel. "Optical connector" may refer herein to any optical component suitable for being arranged at one end of an optical fiber and for optically connecting the optical fiber to a further optical component, in particular with the optical fiber coupling device of the invention. The coupling mechanism is configured for receiving an optical connector such that an optical axis of the optical fiber connector is aligned with the axial opening of the optical fiber coupling device, such that light can be transmitted, substantially without any losses or reflections, from the optical fiber, through the optical fiber connector and through the axial opening.

The coupling mechanism may be compliant with any of the commercially available optical fiber coupling standards that are known to the skilled person, such as QBH, QD or FCH-16. The coupling mechanism may thus preferably be adapted to receive an optical fiber connector based on any of these optical interconnection standards.

The coupling mechanism may be arranged at the first axial end of the axial channel, meaning that the coupling mechanism is arranged and/or extends in a proximity of the first axial end of the axial channel, although it needs not be arranged and/or extend precisely at the very first axial end of the actual channel, although this is possible according to some embodiments of the invention. Being arranged "at the first axial end" may in particular imply that the coupling mechanism is arranged and/or extends closer to the first axial end of the actual opening band to the second axial end.

The optical fiber coupling device of the invention further comprises a lid mechanism configured for opening and closing the axial channel. The lid mechanism comprises a driver element and a lid element.

The driver element may be arranged at least in part on an external side of the main coupling structure, preferably completely arranged on said external side of the main coupling structure. This may in particular mean that no part of the driver element is arranged within the main coupling structure. The "external side" of the main coupling structure in which the driver element is arranged may correspond to a side or surface of the main coupling structure that faces an optical fiber connector, when the optical fiber connector is coupled to the optical fiber coupling device, away from the interior of the main coupling structure. Additionally or alternatively, the "external side" of the main coupling structure in which the driver element is arranged may correspond to a side or surface of the main coupling structure that extends perpendicularly to the axial direction and/or to the axial channel. The driver element is movable between a first position and a second position.

Since the driver element is externally arranged on the main coupling structure, it may be operated or be mechanically actuated upon from an exterior of the optical fiber coupling device, for example by a human operator and/or via a functional or mechanical coupling with a further component. The driver element can hence be moved between the first and second positions from the exterior of the main coupling structure.

The lid element is arranged at least in part within the main coupling structure, preferably completely arranged within the main coupling structure. This means that the lid element is at least partly or completely enclosed by the main coupling structure. The lid element is movably attached to the main coupling structure and is movable, preferably pivotable, between a closed position and an open position. In the closed position, the lid element closes the axial channel, i.e. physically blocks the axial channel, preferably tightly. In the open position, the lid element exposes the axial channel and does not physically block it. Thus, considering that the axial channel extends from the first axial end to the second axial end, it can be said that both axial ends of the axial channel may be in fluid communication with each other when the lid element is in the open position, whereas such fluid communication is interrupted by the lid element when the lid element is in the closed position.

In other words, in the closed position the lid element physically intersects the axial channel, such that a cross-section of the axial channel is covered by the lid element whereas in the open position, the lid element does not physically intersect the axial channel, such no cross-section of the axial channel is substantially covered or optically blocked by the lid element.

The lid element is configured to open and close the axial channel at an axial lid position along the axial channel axially arranged between the first and second axial ends. In particular, the axial lid position may be axially arranged along the axial channel between the second axial end and an axial position of the driver element.

According to the invention, the lid element is magnetically coupled with the driver element such that, when the driver element is in the first position, the lid element is in the open position, and when the driver element is in the second position, the lid element is in the closed position.

Due to the magnetic coupling between the lid element and the driver element, the lid element follows a movement of the driver element when the driver element is moved. In other words, a movement of the lid element is driven by the driver element. The lid element is hence magnetically driven by the driver element. Thus, when the driver element is moved to the first position, the lid element moves to the open position, and when the driver element is moved to the second position, the lid element moves to the closed position.

In particular, if the driver element is moved from the second position to the first position, the lid element moves from the closed position to the open position, while if the driver element is moved from the first position to the second position, the lid element moves from the open position to the closed position, in particular perpendicular to the axial direction.

Thus, whether the axial channel extending through the main coupling structure is closed or open may be controlled from an external side of the main coupling structure by means of the driver element, which magnetically drives the lid element, which is internally arranged within the main coupling structure. The lid element may hence effectively split the axial channel in a first portion proximal to the first axial end, which may be exposed to the environment or to the optical fiber or optical fiber connector being connected to the optical fiber coupling device of the invention from the first axial end, and a second portion proximal to the second axial end, which may be exposed to the environment from the first axial end only when the lid element is in the open position but may be isolated from said environment on the side of the first axial end when the lid element is in the closed position. The second portion of the axial channel may be exposed to an environment or a further optical component arranged or connected downstream from the optical fiber coupling device of the invention irrespectively of whether the lid element is in the open or in the closed position.

The lid mechanism of the invention hence allows selectively sealing or unsealing the axial channel that extends through the main coupling structure by correspondingly setting the driver element, thereby making possible a contamination-free optical coupling operation: the lid element can be controlled by the driver element to remain in the closed position while an optical fiber connector is being coupled to the coupling mechanism, such that no contaminants—for example particles of the material of which the coupling mechanism is made liberated through mechanical abrasion—can penetrate through the axial channel. Once the coupling operation is completed, such that the optical fiber connector is coupled to the coupling mechanism and needs not be moved further, the lid element can be controlled by the driver element to switch to the open position, thereby unblocking the axial channel and hence allowing optical communication therethrough. Since the coupling between the driver element and the lid element is magnetic, the driver element and the lid element may be fluidly isolated from each other, in particular by the main coupling structure or at least a portion thereof and no reach-through structures through the main coupling structure, such as openings or the like, are necessary for the operation of the lid mechanism, which could open possible ways for contaminants to penetrate into the system.

The optical fiber coupling device of the invention may hence be used for optically coupling an optical fiber connector (and an optical fiber attached thereto) to a further optical component, such as an optical module, to which the optical fiber coupling device may be attached, in a contamination-safe manner.

In preferred embodiments of the invention, the lid element may be structurally independent from the driver element. Since the lid element and the driver element are magnetically coupled to each other, there is no need for any further structural link or connection between them. Therefore, the lid element and the driver element of the invention can be arranged on/in the main coupling structure spatially separated from each other. In particular, there might be no direct contact between the lid element and the driver element.

In some embodiments, a portion of the main coupling structure may extend between the driver element and the lid element. The lid element and the driver element may be axially separated from each other by said portion of the main coupling structure extending between the driver element and a lid element. Such portion may be referred herein as "separating portion" of the main coupling structure.

According to some embodiments, an interior of the main coupling structure in which the lid element is arranged may be tightly isolated from the external side of the main coupling structure in which the driver element is arranged. The tight isolation may be provided by the main coupling structure itself, for example when the main coupling structure materially encloses the lid element completely. Of course, such tight isolation may be broken by the axial channel, when the axial channel is exposed to the environment, for example not being capped by a capping element to which reference will be made below. "Tight isolation" as used herein may hence refer to the fact that the interior of the main coupling structure in which the lid element is arranged may be tightly isolated from the external side of the main coupling structure in which the driver element is arranged, such that substantially no fluid communication, in particular no direct fluid communication, is established between the exterior and the interior of the main coupling structure, other than a theoretically possible fluid communication through the axial channel. However, since the driver element is arranged at least in part on an external side of the main coupling structure, for example around the axial channel and around the coupling mechanism, the structure and shape of the main coupling structure may be such that the possibility of contaminating particles travelling through the axial channel from the exterior of the main coupling structure to the interior of the main coupling structure is negligible.

According to some preferred embodiments, the lid element may comprise an axial portion extending in the axial direction and a radial portion extending perpendicular to the axial direction, i.e. in a radial direction or radial plane. The lid element may be magnetically coupled with the driver element by the axial portion, whereas the lid element may close or expose the axial channel with the radial portion. Thus, the lid element may comprise an axial portion that may extend substantially parallel to the axial direction, in particular substantially parallel to the axial channel, and a radial portion that may extend substantially perpendicular to the axial channel. The axial portion is the portion of the lid element may implement the magnetic coupling to the driver element such that, when the driver element moves, the driver element magnetically transmits motion to the axial portion of the lid element, which in turn mechanically transmits the motion to the rest of the lid element, in particular to the radial portion thereof, which may then move to the closed or open position correspondingly.

The axial portion of the lid element may comprise a magnetic portion for implementing the magnetic coupling with the driver element, in particular through the separating portion of the main coupling structure. The radial portion of the lid element may be configured for moving perpendicularly to the axial direction, in particular substantially perpendicularly to the axial channel, for opening and closing the axial channel. The axial portion and the radial portion of the lid element may be materially connected with each other.

According to some embodiments, the driver element may comprise a magnetic portion for implementing the magnetic coupling with the magnetic portion of the lid element. The optical fiber coupling structure may be correspondingly configured such that, the driver element can be arranged over the lid element, with the magnetic portion of the driver element vertically overlapping the magnetic portion of the lid element, such that the magnetic coupling is implemented between the magnetic portions of the lid element and the driver element. The magnetic portion of each of the driver element and the lid element may for example comprise a ferromagnetic material, such as for example neodym.

In preferred embodiments of the invention, the lid element, in particular an axial portion of the lid element, may be separated from the driver element, in particular axially separated, by a distance of 5 mm or less, preferably 1 mm or less, for example between 0.5 mm and 1 mm, in particular by a separating portion of the main coupling structure.

The separating portion of the main coupling structure may be the portion of the main coupling structure at which a distance between the lid element and the driver element is minimal, in order to implement the magnetic coupling between the lid element and the driver element with maximal efficiency. A thickness of the separating portion of the main coupling structure extending between the lid element and the driver element in the axial direction may be equal to or smaller than the distance separating the driver element from the lid element. The main coupling structure, in particular the separating portion thereof, may preferably be of a magnetically permeable material such as for example aluminium or a plastic material, in order not to screen or suppress the magnetic coupling between the lid element and the driver element therethrough.

A magnetic portion of the lid element may be arranged at a position of the lid element, in particular of the axial portion thereof, closest to the driver element (i.e. closest to the separating portion of the main coupling structure), in particular to the magnetic portion of the driver element. Accordingly, a separation distance between the magnetic portion of the lid element and the magnetic portion of the driver element may correspond to a shortest axial separation between the lid element and the driver element through the separating portion of the main coupling structure and may be in the aforementioned range of 5 mm or less, preferably 1 mm or less, for example between 0.5 mm and 1 mm.

In preferred embodiments of the invention, the lid element, in particular the radial portion of the lid element, may comprise a closing portion configured for completely overlapping a cross-section of the axial channel, such that when the lid element is in the closed position, the closing portion completely covers the cross-section of the axial channel. The closing portion may be a portion of the lid element, in particular of the radial portion of the lid element, that is specially shaped and configured for covering a cross-section of the axial channel, in particular at the aforementioned axial lid position, when the lid element is in the closed position. For example, if the axial channel has a circular cross-section with a first diameter, the closing portion of the lid element may have a circular shape with a second diameter greater than the first diameter, such that the closing portion of the lid element can completely overlap the cross-section of the axial channel. The closing portion of the lid element may radially protrude from the rest of the radial portion of the lid element, which may otherwise have an elongated shape.

In preferred embodiments of the invention, a recess may be formed in the closing portion of the lid element. When the lid element is in the closed position, the recess faces the interior of the axial channel towards the first axial end and away from the second axial end. The recess may be formed as a deepening on the surface of the closing portion of the lid element configured for facing the first axial end, such that, eventual contaminating particles, for example resulting from mechanical abrasion produced during a coupling operation, which do not completely cross the axial channel due to the lid element blocking the axial channel, can be collected in the recess of the closing portion. This may ensure that such accumulated potentially contaminating particles do not circulate through the axial channel in an uncontrolled manner, even when the closing portion of the lid element moves, in particular in the radial direction, when the lid element moves between the closed position and the open position. The depth of the recess may be between 0.1 mm and 5 mm, preferably between 1 mm and 3 mm, wherein a thickness of the closing portion of the lid element, measured in the axial direction, may be between 0.5 mm and 10 mm, preferably between 1.5 mm and 3.5 mm is.

In some embodiments of the invention, the closing portion of the lid element, in particular a surface thereof facing the first axial end when the lid element is in the closed position, may comprise an adhesive material, for example an adhesive film or layer, for example silicon, such that eventual contaminating particles, for example resulting from mechanical abrasion produced during a coupling operation, do not completely cross the axial channel due to the lid element blocking the axial channel and are instead adhesively captured by the closing portion. In embodiments in which the closing portion comprises the aforementioned recess, such adhesive material may be arranged within the recess.

The main coupling structure may comprise in some embodiments a guiding slit for guiding a movement of a portion of the lid element, in particular of the axial portion thereof, wherein the guiding slit preferably has a curved or arced profile about a pivoting point of the lid element, in particular substantially perpendicularly to the axial direction. The guiding slit may be configured having an extension in the axial direction appropriate for receiving the axial portion of the lid element and having an extension in a direction perpendicular to the axial direction appropriate for allowing a movement of the axial portion along the guiding slit about a pivoting point of the lid element, in particular between the open position and the closed position of the lid element. The lid element may be in the closed position when the axial portion thereof is at a first end of the guiding slit, whereas the lid element may be in the open position when the axial portion thereof is at the other end of the guiding slit. The guiding slit may hence extend partially around the axial channel, such that when the axial portion of the lid element moves along the guiding slit, the radial portion of the axial channel moves perpendicularly to the axial channel such that the axial channel is blocked or unblocked by the radial portion of the lid element.

The guiding slit may be a dedicated slit purposely formed in the main coupling structure of an optical fiber coupling device in order to adapt an optical fiber coupling device according to the prior art to operate according to the principles of the present invention or formed when manufacturing from scratch an optical fiber coupling device according to the invention. However, the guiding slit may also be an internal cavity or gap present in the main coupling structure of an optical fiber coupling device according to the prior art, which may then require no dedicated forming of a guiding slit, in particular through extractive processes, for adapting the optical fiber coupling device to operate according to the principles of the present invention. Instead, such pre-existing cavity or gap may be used for receiving and guiding the axial portion of the lid element, in particular by appropriately adapting a shape and/or a design of the lid element if necessary.

According to some embodiments, the optical fiber coupling device may comprise one or more limit sensors configured for detecting when lid element reaches or is in the closed position and/or reaches or is in the open position, in particular the fully closed position and/or the fully open position. The optical fiber coupling device may further comprise a control unit connected or connectable to the one or more limit sensors and configured to detect, through an operational connection to the one or more limit sensors, whether the lid element reaches or is in the closed position and/or reaches or is in the open position, in particular the fully closed position and/or the fully open position.

For example, the one or more limit sensors and the control unit may be configured for detecting whether the axial portion of the lid element is or reaches the first and/or second end of the guiding slit. The one or more limit sensors may for example comprise a first and a second limit switch respectively arranged at the first end and at the second end of the guiding slit and may be configured to communicate to the control unit, whether the axial portion of the lid element is or reaches the first and/or second end of the guiding slit.

Thereby, the control unit may detect whether the lid element is in the (fully) open position or in the (fully) closed position. This may prevent malfunction or misuse of the optical fiber coupling device of the invention due to a coupling or decoupling action being initiated with the lid element still being in an intermediate position between the open position and the closed position. The control unit may be connected or connectable to a correspondingly configured warning device in order to produce a confirmation signal, for example a light signal, a software command signal, or an acoustic signal, when the control unit detects that the lid element is or reaches the (fully) open position or the (fully) closed position via the corresponding limit sensor(s). For example, a user operating the optical fiber coupling device of the invention may await a confirmation signal that the lid element is in the closed position before initiating an operation to decouple an optical fiber connector from the device.

Additionally or alternatively, the control unit may be configured for interacting with a control circuit of a laser unit producing laser light being coupled into the optical fiber coupling device of the invention, such that the laser unit can only be activated under the condition that the control unit detects that the lid element is in the open position.

In some embodiments, the lid element may comprise a visual indicator and the main coupling structure may be configured for allowing an optical contact between the exterior of the main coupling structure and the visual indicator. The visual indicator may be configured for visually indicating whether the lid element is in the closed or in the open position. For example, the visual indicator may be a movable mechanical element having differently coloured parts (e.g. black/white, green/red) that are visible through the main coupling structure depending on whether the lid element is in the open position or in the closed position, in particular due to the visual indicator taking different corresponding positions. This may allow controlling the position of the lid element from the exterior without requiring any control unit and/or any dedicated electronic means. The visual indicator may in particular be arranged in the axial portion of the lid element.

The optical fiber coupling device may be configured such that, when the driver element moves between the first and second positions, the aforementioned magnetic portion of the driver element moves over the guiding slit, in particular on an external surface of the main coupling structure, between a vertical projection of a first end of the guiding slit and a vertical projection of a second end of the guiding slit, thereby magnetically driving the magnetic portion of the lid element, which may be received in the guiding slit, so that the lid element is driven between the closed position and the open position, correspondingly.

According to some embodiments, the driver element may be rotatable between the first position and the second position, in particular around the axial channel. The driver element may hence be a rotatable element and the first and second positions may correspond, respectively, to different rotational positions of the driver element. The first and second positions may be rotational positions separated by a rotation angle, for example a rotation angle of 180° or less, 90° or less or 45° or less.

According to some embodiments, the lid element may be pivotable with respect to the main structure between the open position and the closed position about a pivoting point. The pivoting point may be radially offset from the axial channel. In a cross-sectional plane perpendicular to the axial direction, the pivoting point may be separated from the axial channel and not overlapping the axial channel. Preferably, the pivoting point may be arranged at a first radial end of the radial portion of the lid element, while the axial portion of the lid element extends from a second radial end of the radial portion of the lid element, the second radial end being opposed to the first radial end, such that the radial portion of the lid element radially extends from the first radial end to the second radial end.

Thus, when moving between the closed position and the open position, the lid element, in particular a radial portion thereof, may pivot about the pivoting point. A closing portion of the radial portion of the lid element may be radially arranged between the pivoting point and the radial projection of the axial portion of the lid element, i. e. between the first and second radial ends of the radial portion of the lid element. Given that the pivoting point is axially offset from the axial channel, when the radial portion of the lid element moves between the open position in the closed position, for example due to a movement of the axial portion of the lid element along the aforementioned guiding slit driven by a corresponding movement of the driver element, the lid element can correspondingly block or unblock a cross-section of the axial channel, in particular by the closing portion of the lid element.

According to some embodiments of the invention, the driver element may be arranged around the axial channel. Additionally or alternatively, the driver element may be ring-shaped. Such configurations may simplify an operation to couple an optical fiber connector to the optical fiber coupling device of the invention while operating the driver element in order to open and close the axial channel by simply rotating the driver element correspondingly.

In some embodiments of the invention, the main coupling structure may comprise a first structure body and a second structure body removably attached or removably attachable to the first structure body. The first and second structure bodies may respectively correspond to first and second axial portions of the main coupling structure. The driver element may be arranged or arrangeable on an external surface of the first structure body, and the lid element may be arranged or arrangeable between the first structure body and the second structure body. The first axial end of the axial channel may be arranged at the first structure body and the second axial channel may be arranged at the second structure body. A first portion of the axial channel may be arranged in the first structure body and a second portion of the axial channel may be arranged in the second structure body. When the first structure body and a second structure body are attached to each other, the axial channel may be formed and the lid element, in particular a radial portion thereof, may be axially arranged or sandwiched between the first structure body and the second structure body. The aforementioned guiding slit for receiving an axial portion of the lid element and guiding a movement thereof may be formed in the first structure body. By being formed by two removable or detachable structure bodies, the main coupling structure may advantageously allow accessing the interior thereof, for example for carrying out maintenance and replacement tasks, for instance upon the lid element. For example, the interior of the main coupling structure may be accessed for replacing or cleaning the lid element, for example for emptying a recess formed in a closing portion of the lid element from potentially contaminating particles. The first structure body and the second structure body may be removably attached to each other by means of appropriate removable attachment means such as screws or the like.

According to preferred embodiments of the invention, the optical fiber coupling device may further comprise a capping element for closing the axial channel from the first axial end. The capping element may be removably attachable to the first axial end of the axial channel and may be configured for isolating an interior of the axial channel, in particular a portion of the axial channel extending between the first axial end and the axial lid position, from an environment, in order to prevent potentially contaminating particles from accessing the interior of the axial channel, for example during transportation or storage or during periods of time in which no optical fiber is connected to the optical fiber coupling device of the invention.

In some preferred embodiments of the invention, the optical fiber coupling device may further comprise a locking element for locking the optical fiber connector when the optical fiber connector is coupled to the coupling mechanism. The locking element may be configurable or adjustable in a locked configuration, in which the locking element may lock the optical fiber connector, and in an unlocked configuration, in which the locking element unlocks the optical fiber connector. Thus, the locking element can be set in a locked configuration or in an unlocked configuration: when set in the locked configuration, the locking element locks the optical fiber connector in position while the optical fiber connector is coupled to the coupling mechanism such that, for example, the optical fiber connector cannot detached from the coupling mechanism in an uncontrolled manner. In the unlocked configuration, the locking element unlocks or releases the optical fiber connector such that it can be freely detached from the coupling mechanism, for example for being decoupled from the optical fiber coupling device.

The locking element may hence functionally cooperate with the coupling mechanism. The coupling mechanism may receive an optical fiber connector and thereby define a position and orientation of the optical fiber connector after coupling, in particular such that a light beam coming out of the optical fiber connector is aligned with the axial channel. The locking element may secure the optical fiber connector in position, i. e. in the position determined by the coupling mechanism.

In some embodiments, the coupling mechanism may comprise the locking element, i.e. the coupling mechanism and the locking mechanism may be the same component, configured for receiving and locking/unlocking an optical fiber connector. In some other embodiments, however, the coupling mechanism and the locking element may be structurally independent from each other.

The driver element may be coupled to the locking element such that, when the locking element is in the unlocked configuration, the driver element is in the first position and, when the locking element is in the locked configuration, the driver element is in the second position. By means of this configuration and in view of the correspondence between the open and closed positions of the lid element and the first and second positions of the driver element, the locking element can ensure that the optical fiber connector is held in position while the lid element is in the open position and that a coupling operation, for example to couple or uncouple the optical fiber connector with the optical fiber coupling device of the invention via the coupling mechanism, can only take place with the lid element in the closed position in order to guarantee a contamination-free operation.

In preferred embodiments of the invention, the driver element may be mechanically coupled to the locking element. The driver element may comprise a mechanical actuator implementing a mechanical coupling between the driver element and the locking element. The locking element may for example be a locking element known from the prior art, as used in optical fiber coupling devices present in the market, in particular optical fiber coupling devices according to the QBH, QD or FCH-16 coupling standards, and the locking element may be a corresponding movable component that locks or unlocks an optical fiber connector during a coupling or uncoupling operation. According to the invention, the driver element can be configured for being attached to an existing locking element, for example by means of a direct mechanical coupling, which can thereby be adapted to operate according to the present invention. For example, for an existing locking element having notches, dents or the like, the driver element may be designed to have a protrusion configured for fitting into said notches or dents in order to mechanically couple the driver element to the locking element such that a movement of the locking element directly induces a corresponding movement of the driver element.

In some preferred embodiments, the driver element may comprise a mechanical actuator for mechanically operating the driver element. Additionally or alternatively, the driver element may comprise a mechanical actuator for mechanically coupling the driver element to a further movable component of the optical fiber coupling device, for example to the locking element. In some embodiments, the mechanical actuator may be configured for mechanically coupling the driver element to an optical fiber connector, such that, when the optical fiber connector is moved for being coupled to the coupling mechanism and/or for being locked/unlocked by the locking element, the driver element is correspondingly moved between the first and second positions by means of the mechanical actuator, correspondingly.

In preferred embodiments of the invention, the locking element may be rotatable between the locked configuration and the unlocked configuration. A rotation of the locking element may then cause a corresponding rotation of the driver element, which may also be a rotatable component, and the rotation of the driver element may induce a corresponding movement of the lid element.

In some preferred embodiments, the locking element may comprise a bayonet mechanism, a threaded mechanism and/or a snap mechanism for locking and unlocking the optical fiber connector.

According to some preferred embodiments, the optical fiber coupling device may be an optical fiber collimator and may comprise a collimating lens for collimating laser light transmitted from the optical fiber connector through the axial channel. The collimating lens may preferably be arranged at a second axial end of the axial channel.

The optical fiber coupling device of the invention may be configured for being attached to a further optical component, in particular to a laser module, for acting as a laser light inlet or port, such that laser light, in particular laser light from an optical fiber, can be fed into said further optical component or laser module through the optical fiber coupling device of the invention. The optical fiber coupling device may comprise appropriate attachment means for being removable attached to such further optical component or laser module, for example by means of screws or the like.

A further aspect of the invention refers to a laser module for laser-processing a workpiece, wherein the laser module comprises at least one optical fiber coupling device according to any of the embodiments of the invention previously described, wherein at least one laser beam enters the laser module through the at least one optical fiber coupling device. The laser module further comprises at least one laser deflection system for deflecting the at least one laser beam to laser-process the workpiece. The at least one laser deflection system may in particular comprise movable mirrors, such as an XY-mirror pair for deflecting the at least one laser beam and fixed and/or movable lenses for focusing the at least one laser beam in order to laser-process the workpiece.

BRIEF DESCRIPTION OF THE DRAWINGS

FIG. 2a shows a perspective view, FIG. 2b shows a top view and FIG. 2c shows a side view.

FIG. 3a shows

13 the driver element in a first position and FIG. 3b shows the driver element in a second position.

Figure 4:
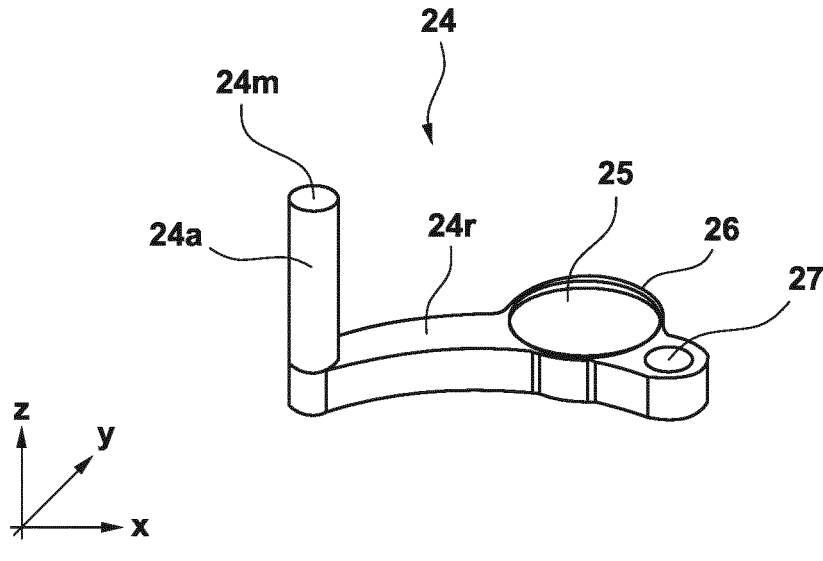
Figure 4:
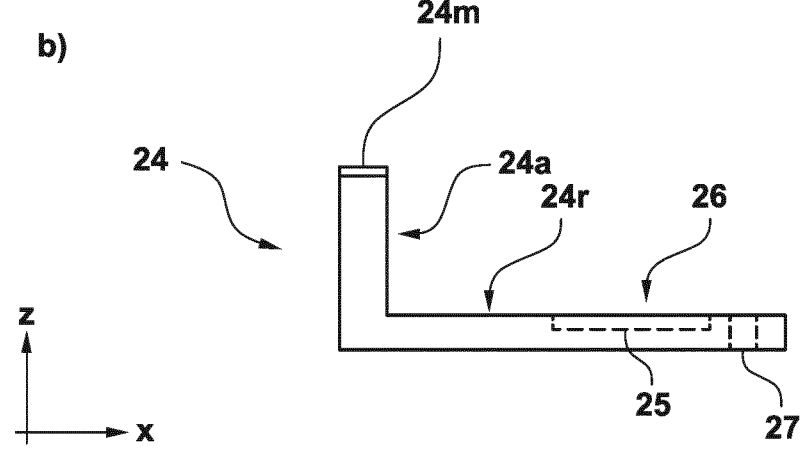
Figure 4:
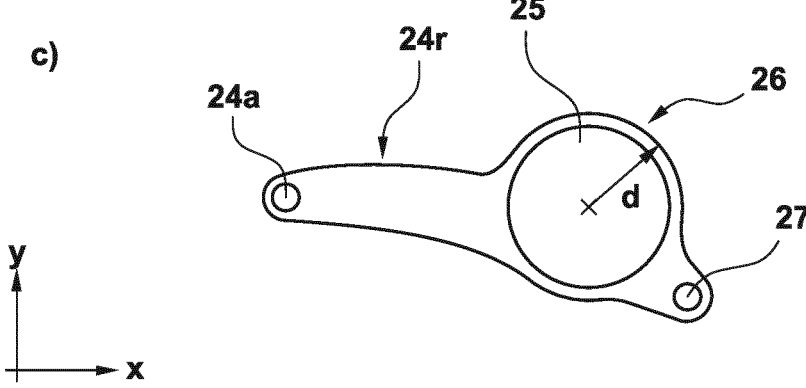

FIG. 4 shows schematic views of a lid element of an optical fiber coupling device according to embodiments of the invention. FIG. 4a shows a perspective view, FIG. 4b shows a side view and FIG. 4c shows a top view.

Figure 1:
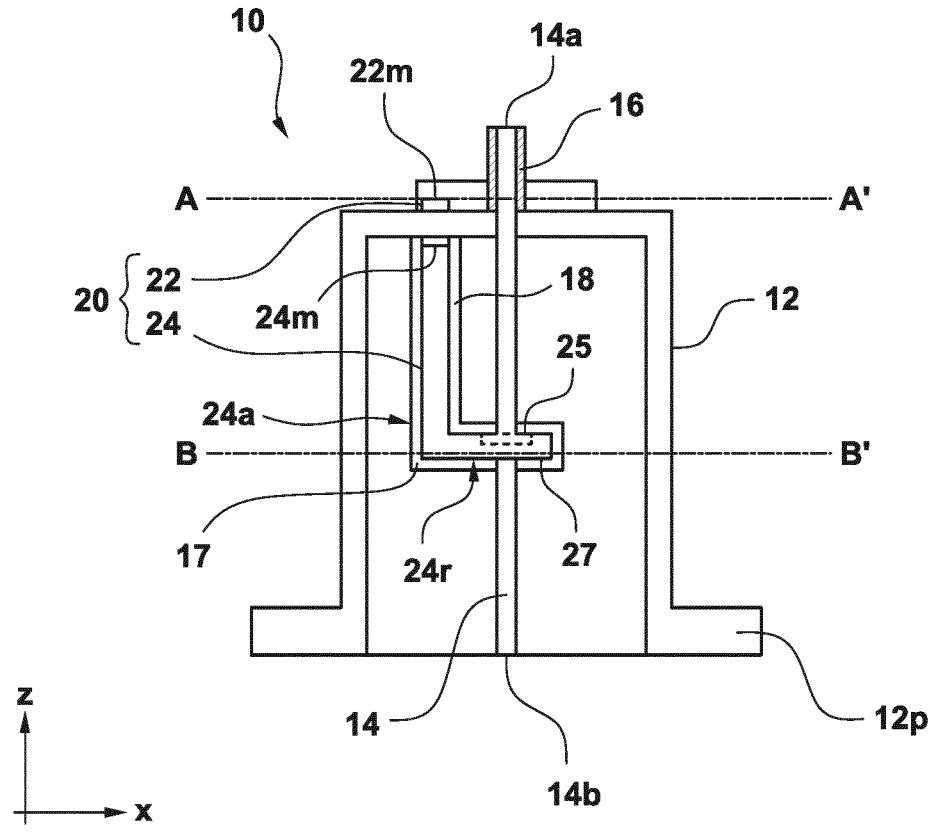
FIG. 1 shows a cross-sectional side view of an optical fiber coupling device according to embodiments of the invention.
Figure 5:
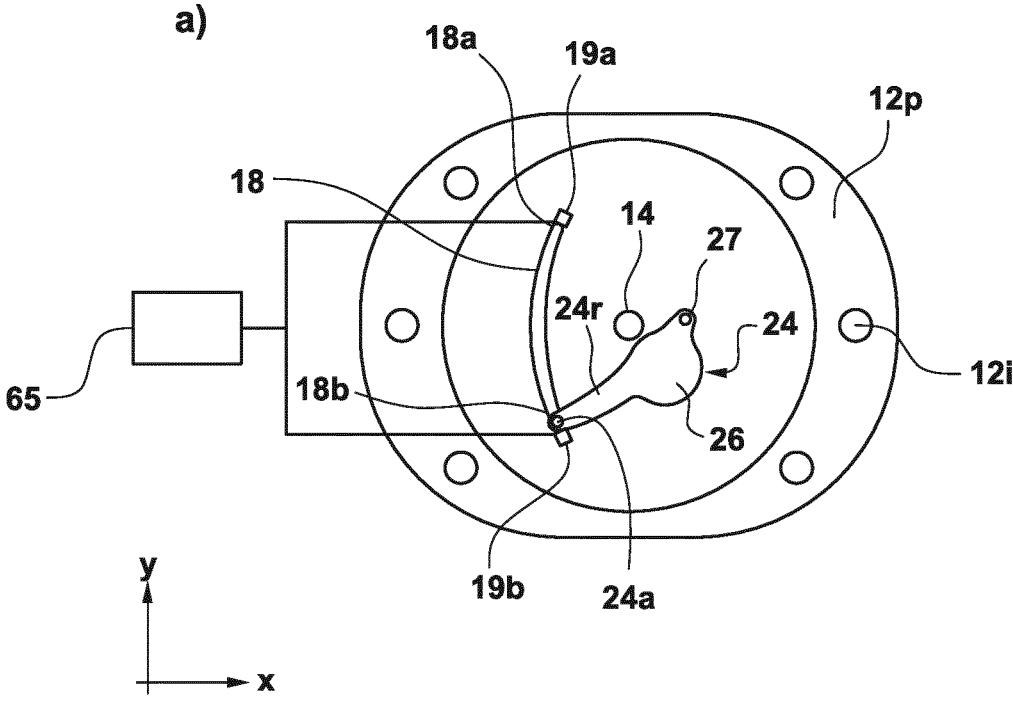
Figure 5:
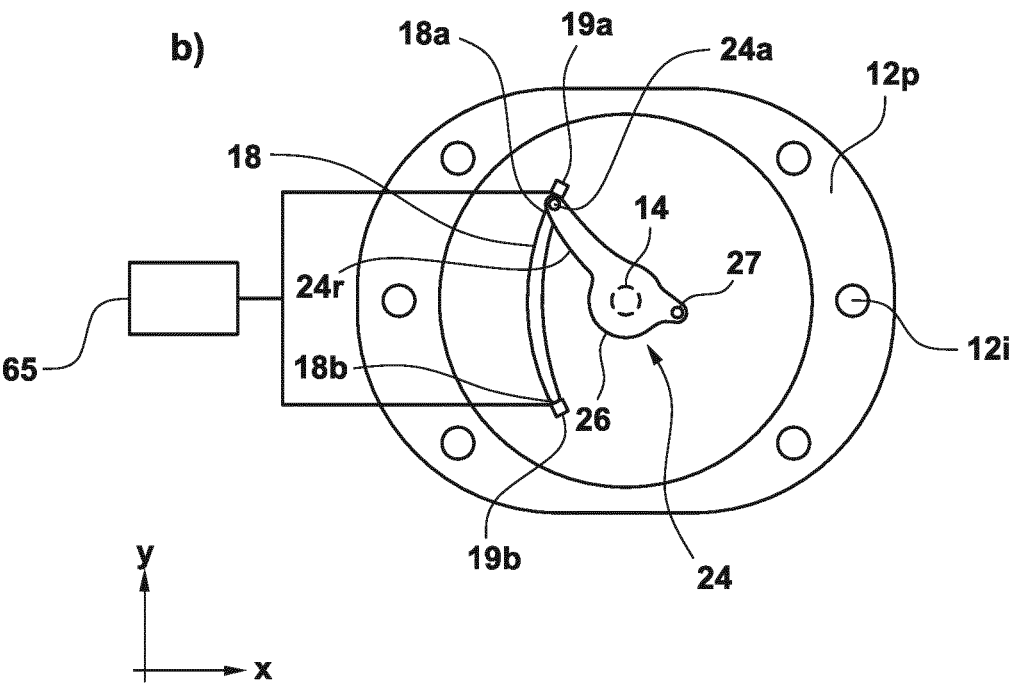

FIG. 5 shows schematic top cross-sectional views of the device of FIG. 1 at a second cross-sectional plane corresponding to an axial lid position, at which the lid element opens and closes the axial channel of the device. FIG. 5a shows the lid element in the open position and FIG. 5b shows the lid element in the closed position.

Figure 6:
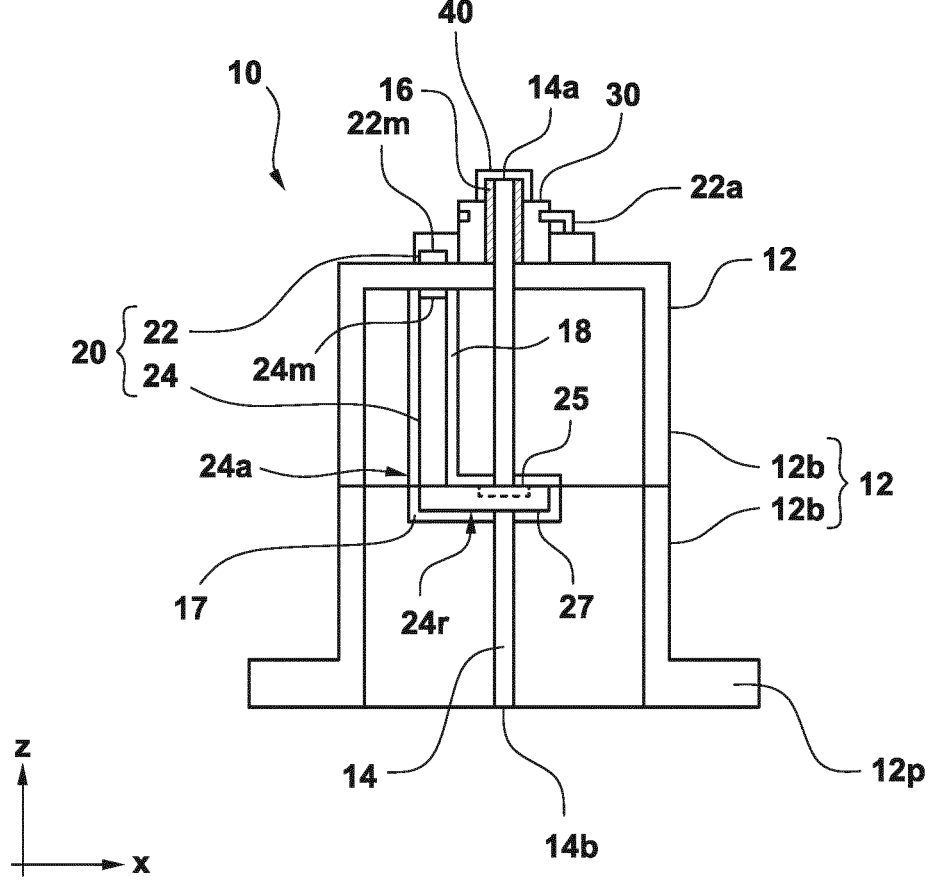

FIG. 6 shows a schematic cross-sectional side view of an optical fiber coupling device according to further embodiments of the invention.

Figure 7:
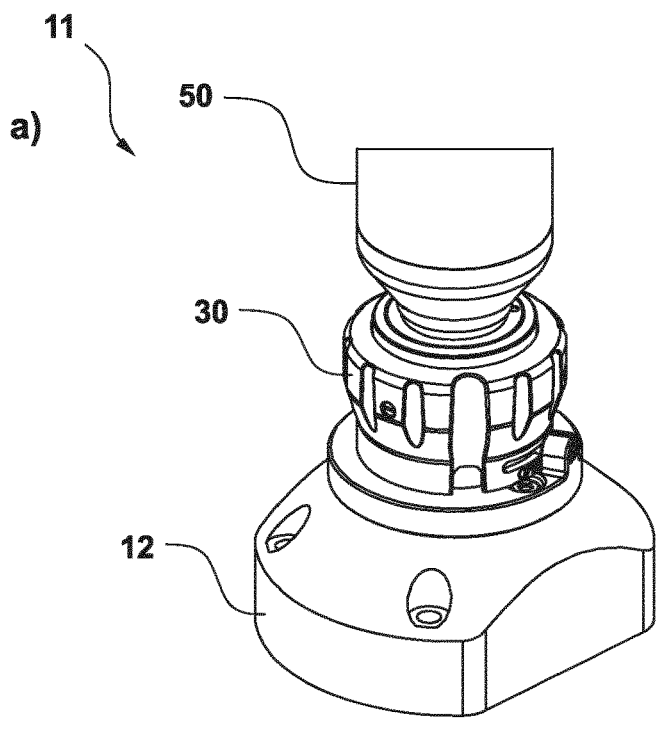
Figure 7:
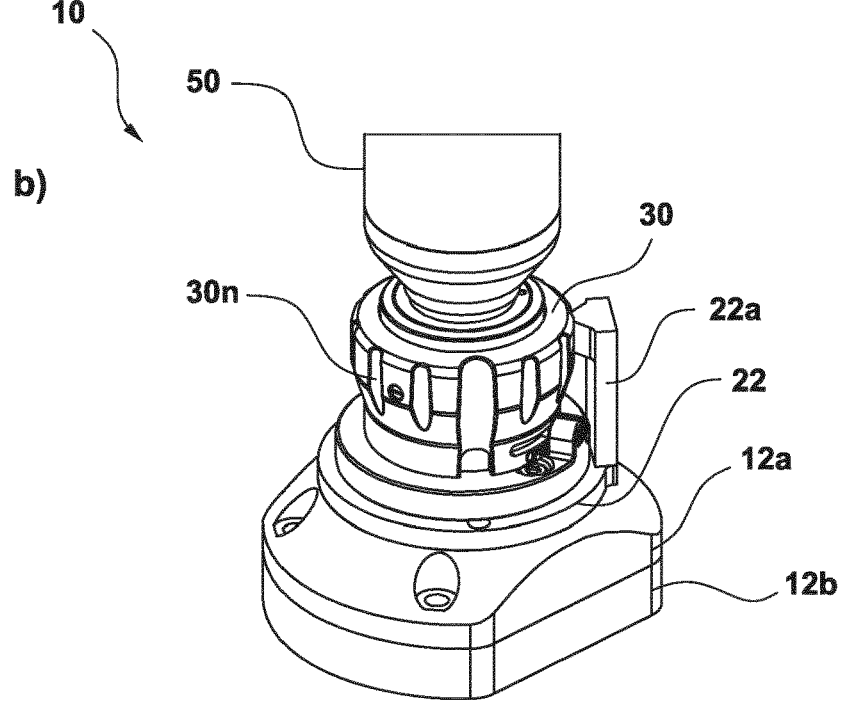

FIG. 7 shows schematic perspective views of an optical fiber coupling device implementing the QBH coupling standard. FIG. 7a shows a device without a lid mechanism and FIG. 7b shows a device including a lid mechanism according to the invention.

Figure 8:
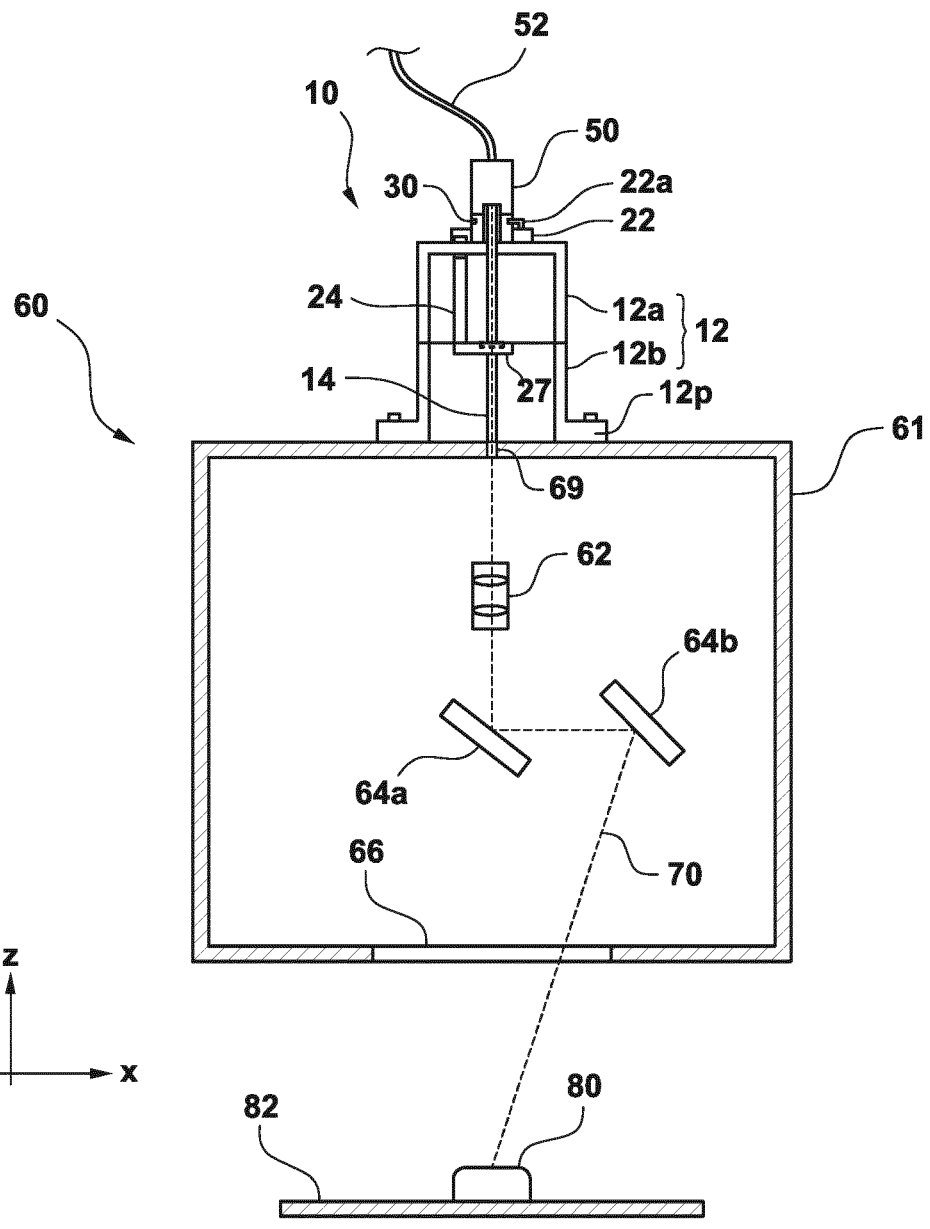

FIG. 8 shows a schematic cross-sectional side view of a laser module according to the invention.

DETAILED DESCRIPTION OF PREFERRED EMBODIMENTS

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

FIG. 1 shows a schematic cross-sectional side view of an optical fiber coupling device 10 according to an exemplary embodiment of the invention. The device 10 comprises a substantially cylindrical main coupling structure 12 made of a metallic material such as aluminium. The main coupling structure 12 comprises an opening that extends therethrough in an axial direction, which in the view shown in FIG. 1 coincides with the vertical z direction, and corresponds to the central axis of revolution symmetry of the substantially cylindrical main coupling structure 12. The opening forms an axial channel 14 that extends through the main coupling structure 12 in the axial direction, from a first axial end 14a to a second axial end 14b.

At a second axial end 14b, i.e. at a lowermost position of the main coupling structure 12 in the z direction as seen in FIG. 1, the main coupling structure 12 comprises a mounting flange 12p that protrudes radially outwards and can be used for mounting the device 10 to a further optical device, in particular to a laser module, for example using screws or the like (see e.g. FIG. 8). When the device 10 is mounted to a further optical device, such as a laser module, the optical device 10 can be used as an input port through which laser light can enter the further optical device, in particular through the axial channel 14.

At the first axial end 14a, the device 10 comprises a coupling mechanism 16 that is configured for receiving an optical fiber connector (not shown in FIG. 1), for example by shape fitting, in order to couple the optical fiber connector to the device 10. In the embodiment shown, the sidewalls of the axial channel 14 at the first axial end 14a form the coupling mechanism 16. When an optical fiber connector having a compliant size is coupled to the coupling mechanism 16, the optical fiber connector is aligned with the axial channel 14 such that light from the optical fiber connector can be optically transmitted through the device 10. In particular, such light can then be transmitted downstream through the axial channel 14 to a further optical component, to which the device 10 can be connected, for example to a laser module.

The optical fiber coupling device 10 further comprises a lid mechanism 20 that is configured for opening and closing the axial channel 14. The lid mechanism 20 comprises a driver element 22, which is entirely arranged on an external side of the main coupling structure 12, as seen in FIG. 1, and a lid element 24, which is entirely arranged within the main coupling structure 12, as seen in FIG. 1. The lid element 24 is enclosed by the main coupling structure 12, while the driver element 22 is exteriorly arranged on the main coupling structure 12.

The driver element 22 and the lid element 24 are structurally independent from each other. The interior of the main coupling structure 12, in which the lid element 24 is received, is substantially tightly isolated from an exterior of the main coupling structure 12, on which the driver element 22 is mounted, since the lid element 24 is enclosed by the material of the main coupling structure 12. The driver element 22 and the lid element 24 are mutually separated in the axial direction (in the vertical direction z as seen in FIG. 1) by a separating portion of the main coupling structure that extends therebetween having a thickness of about 1 mm or less.

Figure 2:
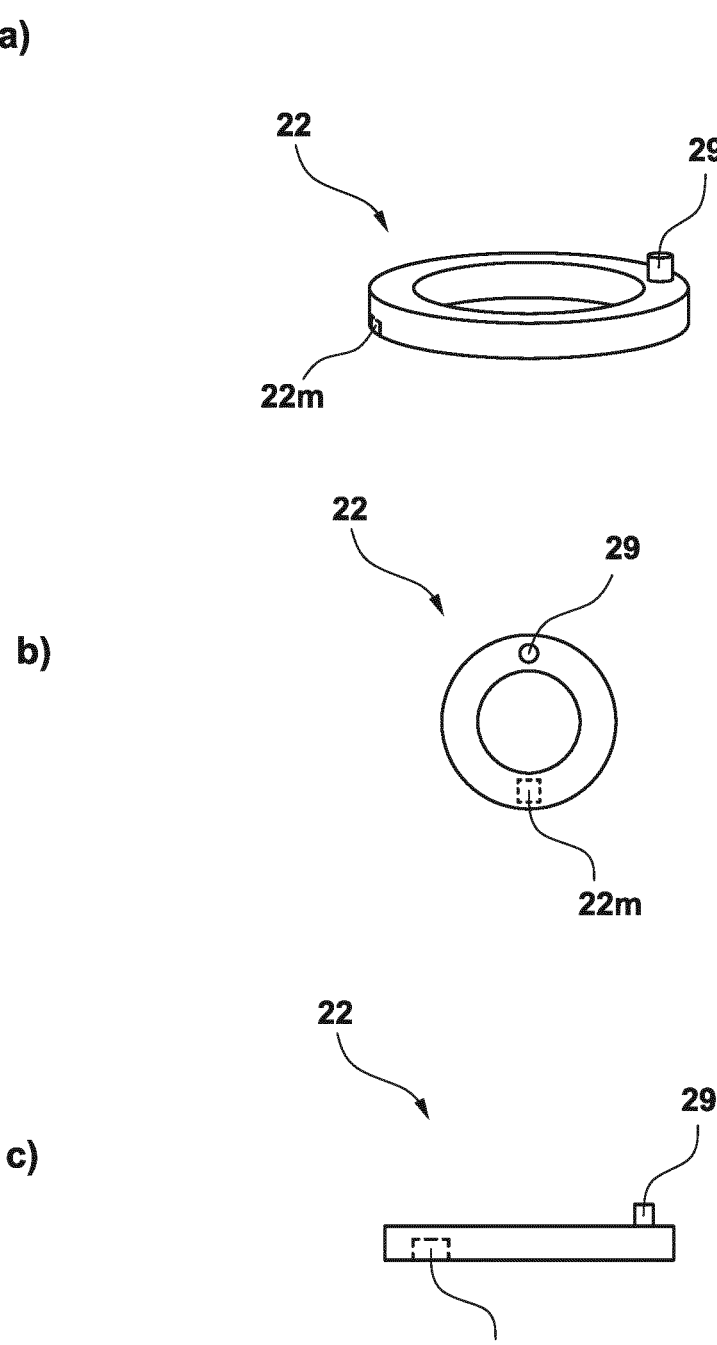
FIG. 2 shows schematic views of a driver element of an optical fiber coupling device according to embodiments of the invention.

FIG. 2 shows schematic views of an exemplary driver element 22 according to some embodiments of the invention. The driver element 22 is ring-shaped and is configured for being arranged around the axial channel 14 and the coupling mechanism 16, on a top surface of the main coupling structure 12 that is substantially perpendicular to the axial direction. In the embodiment shown in FIG. 1, the driver element 22 is arranged around the axial channel 14 and the coupling mechanism 16 at the first axial end 14a, although not exactly coplanar with the first axial end 14a.

Back to FIG. 2, the ring-shaped driver element 22 can be made of a plastic or metallic material, for example aluminium. In the embodiment shown, the driver element 22 comprises a magnetic portion 22m, which comprises a ferromagnetic material embedded within the driver element 22 in contact with a bottom surface thereof. The driver element 22 further comprises a mechanical actuator 29 that allows operating the driver element 22, for example for rotating the driver element 22 about its central axis (i.e. around the axial direction z of FIG. 1), for example manually, and/or mechanically coupling the driver element 22 to other movable components of the device 10 (not shown in FIG. 1). In the exemplary embodiment shown in FIG. 2, the magnetic portion 22m and the mechanical actuator 29 are diametrically opposed, such that an angular separation between them is of about 180°. However, this angular separation is only exemplary and can be different, for example 45°, 90° or any other angular separation in other embodiments.

Figure 3:
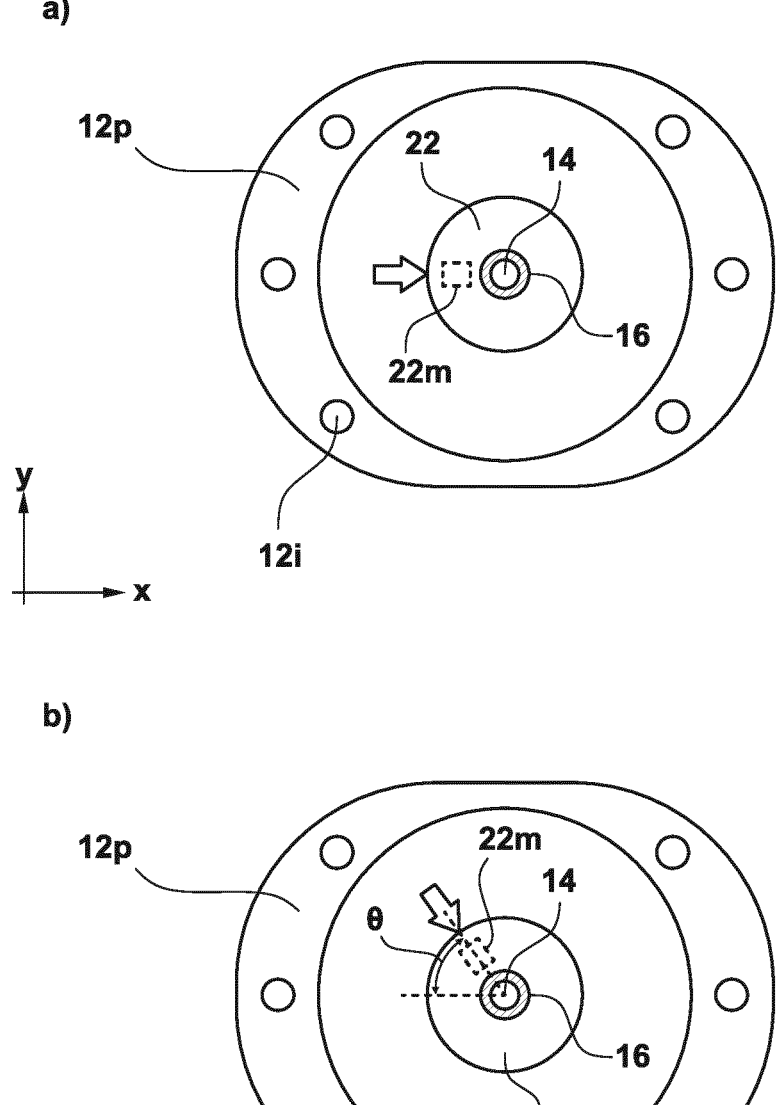
FIG. 3 shows schematic top cross-sectional views of the device of FIG. 1 at a first cross-sectional plane corresponding to the axial position of the driver element.

FIG. 3 shows schematic top cross-sectional views of the device represented in FIG. 1 corresponding to the cross-sectional plane AA', which corresponds to the axial position of the driver element 22. The driver element 22, which is arranged around the axial channel 14 and the coupling mechanism 16, is movable between a first position, which is shown in FIG. 3a, and a second position, which is shown in FIG. 3b. In the embodiment shown, the first and second positions correspond, respectively, to different rotation positions of the driver element 22 about the axial direction z. The difference between both positions is indicated in FIG. 3 by an arrow. In the embodiment shown, a difference between the first position shown in FIG. 3a and the second position shown in FIG. 3b is a rotation angle θ of about 45°. However, in other embodiments, if the first and second positions are different rotation positions, the angle θ may be a different angle of, for example an angle of 90° or of 180° (or any other angle adapted to the movement range of the lid element 24). As schematically shown in FIG. 3, when the driver element is moved from the first position of FIG. 3a to the second position of FIG. 3b, by rotating it by the angle θ, the magnetic portion 22m is correspondingly rotated by an angle θ. In other embodiments, the first and second positions need not correspond to rotation positions and may simply just be different positions of the driver element 22, for example different linear positions or different positions occupied by the driver element 22 on the exterior side of the main coupling structure 12.

Also shown in the top view of FIG. 3 is the mounting flange 12p of the main coupling structure 12, which comprises a plurality of openings 12i configured for receiving a corresponding plurality of screws that can be used for attaching the optical fiber coupling device 10 to a further optical device, in particular to a laser module.

FIG. 4 shows schematic views of the lid element 24. FIG. 4a shows a perspective view, while FIGS. 4b and 4c respectively show a side view and a top view. The lid element 24, which in the embodiment shown can be a piece made of a plastic or a metal material, comprises an axial portion 24a and a radial portion 24r. As seen in FIG. 1, when the lid element 24 is mounted in the interior of the main coupling structure 12 of the optical fiber coupling device 10, the radial portion 24r extends in the radial plane (directions x and y in FIG. 1), perpendicularly to the axial direction (direction z in FIG. 1), i.e. perpendicularly to the axial channel 14, while the axial portion 24a extends in the axial direction, i.e. parallel to the axial channel 14. In the embodiment shown, the axial portion 24a and the radial portion 24r are materially connected with each other and are substantially perpendicular to each other.

The axial portion 24a of the lid element 24 comprises, at its uppermost section as seen in FIG. 4a, a magnetic portion 24m comprising a ferromagnetic material. As seen in FIG. 1, when the lid element 24 is mounted in the device 10, the magnetic portion 24m is arranged at a closest axial position with respect to the driver element 22, only separated from the driver element 22 by the separating portion of the main coupling structure 12, i.e. by a thickness of about 1 mm. Further, the driver element 22 is configured such that, as seen in the cross-sectional view of FIG. 1, the magnetic portion 22m of the driver element 22 is arranged vertically overlapping the magnetic portion 24m of the lid element 24, thereby creating a magnetic interaction between the lid element 24 and the driver element 22.

As seen in the different views of FIG. 4, the radial portion 24r has a substantially elongated shape extending in the radial direction, perpendicularly to the axial direction in which the axial portion 24a extends (i.e. substantially extending in the x direction in the cross-sectional view of FIG. 1). The radial portion 24r comprises a widening forming a substantially circular that is configured for acting as a closing portion 26 of the lid element 24. The closing portion 26 has a diameter d, indicated in FIG. 4c, which exceeds a diameter of the axial channel 14 of the main coupling structure 12. Consequently, the closing portion 26 is suitable for completely overlapping a cross-section of the axial channel 14, such that the lid element 24 can completely close the axial channel by means of the closing portion 26.

FIG. 5 shows two schematic cross-sectional views of the device 10 of FIG. 1 corresponding to the cross-sectional plane BB', which corresponds to an axial closing position. The lid element 24 is movable between an open position, which is represented in FIG. 5a, and a closed position, which is represented in FIG. 5b. In the closed position, shown in FIG. 5b, the lid element 24 closes the axial channel 14. In particular, the lid element 24 is arranged such that the closing portion 26 completely overlaps a cross-section of the axial channel 14. In the open position, shown in FIG. 5a, the axial channel 14 is completely exposed by the lid element 24. In particular, the closing portion 26 does not overlap the cross-section of the axial channel 14.

The lid element 24 is pivotable with respect to the main coupling structure 12 about a pivoting point 27. The pivoting point 27 is arranged radially offset from the axial channel 14, as seen in FIG. 5. The lid element may be fixed to the main structure 12 at the pivoting point by any fixation means such as a screw, bolt, or the like.

As illustrated in FIG. 5, the lid element 24 can be moved between the open position and the closed position by pivoting about the pivoting point 27. To this end, a guiding slit 18 for guiding the movement of the lid element 24 is internally formed in the main coupling structure 12 in the axial direction. In an axial cross-sectional plane corresponding to the xz-plane represented in FIG. 1, the guiding slit 18 extends straight vertically in the axial direction z. The axial portion 24a of the lid element 24 is received within the guiding slit 18. In a cross-sectional plane perpendicular to the axial direction, for example in the cross-sectional plane BB' shown in FIG. 5, the guiding slit 18 has a profile that is curved or arched about the pivoting point 27, such that, when moving along the curved profile of the guiding slit 18, the axial portion 24a of the lid element 24 induces a corresponding movement of the radial portion 24 about the pivoting point 27.

Such movement of the axial portion 24a of the lid element 24 along the guiding slit 18 can be driven by the driver element 22 by means of the magnetic coupling between the magnetic portion 22m of the driver element 22 and the magnetic portion 24m of the lid element 24.

The driver element 22 and the lid element 24 are magnetically coupled such that when the driver element is in the first position shown in FIG. 3a, the lid element 24 is in the open position shown in FIG. 5a, and such that when the driver element 22 is in the second position shown in FIG. 3b, the lid element 24 is in the closed position shown in FIG. 5b.

Starting with the driver element in the second position shown in FIG. 3a, when the driver element 22 is moved to the second position shown in FIG. 3b, by correspondingly rotating the driver element 22 by the angle θ, the magnetic interaction between the magnetic portion 22m and the magnetic portion 24m across the separating portion of the main coupling structure 12 magnetically drives the axial portion 24a along, which then advances from one end 18b of the guiding slit 18 (cf. FIG. 5a) to the opposing end 18a of the guiding slit 18, thereby causing the radial portion 24r of the lid element 24 to swivel from the open position (cf. FIG. 5a) to the closed position (cf. FIG. 5b).

The guiding slit 18 is formed can be formed as an internal cavity in the interior of the main coupling structure 12 allowing for the axial portion 24a of the lid element 24 to move therethrough. As seen in FIG. 1, the main coupling structure can also comprise a further internal cavity 17 formed in a radial plane, through which the radial portion 24r of the lid element 24 can move between the open position and the closed position.

A path of the guiding slit 18 in the xy-plane illustrated in FIG. 5 needs not identically correspond to the angular path followed by the driver element shown in FIG. 3. The design of the lid element 24 can be adapted accordingly.

During a coupling operation in which an optical fiber connector is coupled to the optical fiber coupling device 10 by attaching it to the coupling mechanism 16, the driver element 22 may remain in the second position shown in FIG. 3b, such that the lid element stays in the closed position shown in FIG. 5b and the axial channel 14 is closed by the radial portion 24r of the lid element 24, as schematically shown in FIG. 1. This prevents any contaminating particles, for example debris particles resulting from mechanical erosion during the coupling operation, from travelling through the axial channel 14 and eventually reaching the second axial end 14b and any further optical components connected downstream from the device 10.

As schematically shown in FIG. 5, first and second limit sensors 19a, 19b are respectively arranged at the first and second ends 18a, 18b of the guiding slit 18 and are connected to a control unit 65. When the lid element 18 reaches the open position (FIG. 5a) or the closed position (FIG. 5b), the axial portion 24a activates a respective one of the limit sensors 19a, 19b, whereby the control unit 65 detects that the lid element 24 has reached its final open or closed position, respectively.

As represented in FIGS. 1 and 4, a recess 25 is formed in the closing portion 26, on a surface of the radial portion 24r of the lid element 24 facing the first axial end 14a and facing away from the second axial end 14b, i.e. facing upwards in the schematic view of FIG. 1. The recess 25 can be coated with an adhesive material such as silicon. Therefore, when the lid element 24 is in the closed position (cf. FIG. 5b), any potentially contaminating particles that would cross the axial channel 14 in the absence of the lid mechanism 20 are collected in the recess 25 and do not reach the second axial end 14b. The debris particles are hence prevented from reaching any further optical devices that may be connected downstream from the device 10. In the exemplary embodiment shown in FIG. 4, the recess 25 is a flat recess having a uniform depth with respect to an upper surface and/or a bottom surface of the radial portion 24r. However, the recess may also have a non-uniform depth in other embodiments, for example a concave profile.

Once the coupling operation is completed and the risk of contamination by the environment or by mechanical erosion during the coupling operation itself is no longer high, the axial channel 14 can be opened by rotating the driver element 22 to the first position shown in FIG. 3a, which causes the lid element 24 to swivel to the open position shown in FIG. 5a, in which the axial channel 14 is completely exposed by the lid element 24. The axial channel 14 is then unblocked and allows optically coupling light therethrough. This ensures a contamination-safe coupling operation.

Notably, the magnetic force between the driver element 22 and the lid element 24 exerts a vertical force upon the lid element 24, which results in a tight sealing of the axial channel 14 by the closing portion 26 of the lid element 24. In the schematic cross-sectional view of FIG. 1, this magnetic force is directed upwards in the z-direction.

FIG. 6 shows a schematic cross-sectional view, similar to the view shown in FIG. 1, showing an optical fiber coupling device 10 according to related embodiments of the invention. Most of the features of the device 10 shown in FIG. 6 are features identical or at least corresponding to the respective features described in detail above for the embodiment shown in FIG. 1 and will not be described again on behalf of brevity. Such features are indicated in the embodiment shown in FIG. 6 using the same reference signs used in FIG. 1. The exemplary descriptions above for the components shown in FIGS. 2 to 5 also apply to the embodiment shown in FIG. 6.

The embodiment shown in FIG. 6 differs from the embodiment shown in FIG. 1 in that the main coupling structure 12 of the embodiment shown in FIG. 6 comprises a first structure body 12a and a second structure body 12b, which are removably attached to each other, for example by means of screws, and correspond to different axial portions of the main coupling structure 12. A first axial portion corresponds to the first structure body 12a, on which the driver element 22 is arranged, and which comprises a first axial portion of the axial channel 14 and the guiding slit 18 that receives the axial portion 24a of the lid element 24. The radial portion 24r is arranged at the interface between the first structure body 12a and the second structure body 12b, where a cavity 17 is formed between the first and second structure bodies 12a, 12b for receiving the radial portion 24r and allowing it to move between the open and closed positions. Thus, it is possible to access the interior of the main coupling structure 12, for example to replace or clean the lid element 24, by detaching the first and second structure bodies 12a, 12b, thereby making accessible the interior of the main coupling structure 12 accessible. The attachment between the first and second structure bodies 12a, 12b is preferably such that the interior of the main coupling structure 12 is tight with respect to the exterior thereof.

Also shown in the embodiment of FIG. 6 is a capping element 40 that can be used for closing the axial channel 14 at the first axial end 14a, for example for protecting the interior of the axial channel 14 during maintenance tasks, non-operational time, transportation or storage of the device 10.

The device 10 shown in FIG. 6 further differs from the device 10 shown in FIG. 1 in that it includes a locking element 30 that is arranged around the axial channel 14 and the coupling mechanism 16, between the axial channel 14 and the driver element 22, on the same exterior side of the main coupling structure 12 on which the driver element 22 is arranged. The locking element 30 is configured for locking an optical fiber connector (not shown in FIG. 6) when the optical fiber connector is coupled to the coupling mechanism 16 of the device 10.

The locking element 30 is configurable in a locked configuration and in an unlocked configuration. In the embodiment shown in FIG. 6, the locking element can be rotated between the locked configuration and the unlocked configuration and implements a bayonet mechanism for locking and unlocking the optical fiber connector 50. The driver element 22 is adapted to move between the first position and a second position as the bayonet mechanism of the locking element 30 moves between the locked configuration and the unlocked configuration. Notably, the locking element can implement other types of mechanism in other embodiments, such as a snap mechanism or a threaded mechanism.

Further, the locking element 30 is mechanically coupled with the driver element 22 by a mechanical actuator 22a. The locking element has a plurality of notches 30n and the mechanical actuator 22a is configured for fitting into one of the notches 30n. Due to the mechanical actuator 22a, the driver element 22 and the locking element 30 are configured such that, when the locking element 30 is in the locked configuration, in which the locking element locks the optical fiber connector in position, the driver element is in the first position shown in FIG. 3a, such that the lid element 24 is in the open position shown in FIG. 5a. When the locking element 30 is in the unlocked configuration, in which the locking element 30 unlocks the optical fiber connector, which can then be freely attached or detached from the coupling mechanism 16, the driver element 22 is in the second position shown in FIG. 3b and the lid element 24 is, correspondingly, in the closed position shown in FIG. 5b.

Notably, the link or coupling between the locking element 30 and the driver element 22 needs not be a mechanical actuator 22a and can be any functional link that implements the relationship between the locked and unlocked configurations of the locking element 30 and the first and second position of the driving element 22 according to the invention. The coupling between the locking element 30 and the driver element 22 may for example be a magnetic coupling in other related embodiments.

FIG. 7 illustrates an example of an optical fiber coupling device 11 configured according to the QBH coupling standard, implemented by many devices available in the market. FIG. 7a shows a conventional device 11 that does not include any lid mechanism according to the present invention. An optical fiber connector 50 is coupled to the main structure 12 of the device 11 and locked in position by the rotating locking element 30 through a corresponding bayonet mechanism.

FIG. 7b shows the same device but after being adapted to operate according to the principles of the present invention by incorporating a lid element that is mounted between a first structure body 12a and a second structure body 12b (the lid element is not visible in the exterior view of FIG. 7b) and a driver element 22 that is exteriorly arranged on the first structure body 12a around the locking element 30 and around the axial channel 14 (not shown in the figure) through which laser light from the optical fiber connector 50 is coupled to the device 10.

As seen in FIG. 7b, the locking element 30 has a plurality of notches 30n. The driver element 22 is mechanically coupled to the locking element 30 by means of a mechanical actuator 22a, which is implemented as a vertical extension arm of the driver element 22 having a radial protrusion extending radially inwards and fitting into one of the notches 30n of the locking element 30. Due to the mechanical coupling implemented by the mechanical actuator 22a, the driver element 22 can follow a movement of the locking element 30, such that when the locking element 30 moves between the locked and the unlocked configuration, the driver element 22 moves correspondingly between the first and second positions.

FIG. 8 shows a schematic cross-sectional side view of a laser module 60 according to an embodiment of the invention, which comprises an optical fiber coupling device 10 that is attached to a housing 61 of the laser module 60 by the mounting flange 12p, for example using screws or the like. In the laser module 60, the optical fiber coupling device 10 acts as a connection port or input port, by which a laser beam 70 from an optical fiber 52 can be provided into the laser module 60 through the optical fiber coupling device 10. The optical fiber 52 is optically coupled with the optical fiber coupling device 10 by means of an optical fiber connector 50 that is coupled to the coupling mechanism 16 of the optical fiber coupling device 10.

The optical fiber coupling device 10, besides coupling laser light from the optical fiber 52 into the laser module 60, acts as an optical fiber collimator, since it comprises a collimating lens 69 that is arranged at the second axial end 14b of the axial channel 14 of the optical fiber coupling device 10 and is configured for collimating the laser beam 70. Thus, when the laser beam 70 enters the laser module 60, it is a collimated laser beam.

Within the housing 61, the laser module 60 comprises a set of movable and fixed lenses 62 for pre-focusing the laser beam 70, as well as an x-mirror 64a, movable to deflect the laser beam 70 in the x-direction, and a y-mirror 64b, movable to deflect the laser beam 70 in the y-direction. The laser module 60 may further comprise appropriate control electronics (not shown) for controlling the movement of the optical lenses 62 and the mirror 64a, 64b.

After being focused and oriented by the optical lenses 62 and the movable mirror 64a, 64b, the laser beam 70 exits the interior of the laser module 60 through an optical window 66 of the laser module 60. The optical window 66 may for example be or comprise a cover glass. The laser beam 70 then reaches a workpiece 80 that is arranged on a work field 82 and laser-processes the workpiece 80, for example during an additive manufacturing processing of the workpiece 80.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

The invention claimed is:

1. An optical fiber coupling device comprising:
   a main coupling structure comprising:
   an axial channel extending through the main coupling structure from a first axial end to a second axial end,
   a coupling mechanism configured to couple an optical fiber connector thereto, wherein the coupling mechanism is axially arranged at the first axial end of the axial channel and configured such that, when an optical fiber connector is coupled thereto, light from the optical fiber connector can be transmitted through the axial channel; and
   a lid mechanism configured to open and close the axial channel comprising:
   a driver element arranged at least in part on an external side of the main coupling structure, wherein the driver element is movable between a first position and a second position; and
   a lid element arranged at least in part within the main coupling structure and movably attached thereto, wherein the lid element is movable between a closed position, in which the lid element closes the axial channel, and an open position, in which the lid element exposes the axial channel,
   wherein the lid element is magnetically coupled with the driver element such that, when the driver element is moved to the first position, the lid element follows a movement of the driver element to the open position magnetically driven by the driver element, and when the driver element is moved to the second position, the lid element follows a movement of the driver element to the closed position magnetically driven by the driver element.

2. The optical fiber coupling device of claim 1, wherein the driver element is completely arranged on an external side of the main coupling structure and the lid element is completely arranged within the main coupling structure.

3. The optical fiber coupling device of claim 1, wherein a portion of the main coupling structure extends between the driver element and the lid element.

4. The optical fiber coupling device of claim 1, wherein the lid element comprises an axial portion extending in an axial direction and a radial portion extending perpendicular to the axial direction, wherein the lid element is magnetically coupled with the driver element by the axial portion, and wherein the lid element closes or exposes the axial channel with the radial portion.

5. The optical fiber coupling device of claim 1, wherein an axial portion of the lid element is axially separated from the driver element by 5 mm or less by a separating portion of the main coupling structure.

6. The optical fiber coupling device of claim 1, wherein the lid element comprises a closing portion configured for completely overlapping a cross-section of the axial channel, such that when the lid element is in the closed position, the closing portion completely covers the cross-section of the axial channel.

7. The optical fiber coupling device of claim 6, wherein a recess is formed in the closing portion, wherein when the lid element is in the closed position, the recess faces an interior of the axial channel towards the first axial end and away from the second axial end.

8. The optical fiber coupling device of claim 6, wherein the closing portion comprises an adhesive material.

9. The optical fiber coupling device of claim 1, wherein the main coupling structure comprises a guiding slit for guiding a movement of an axial portion of the lid element, wherein the guiding slit has a curved or arched profile about a pivoting point of the lid element.

10. The optical fiber coupling device of claim 1, further comprising one or more limit sensors configured to detect when the lid element is in the closed position and/or is in the open position.

11. The optical fiber coupling device of claim 1, wherein the lid element is pivotable with respect to the main coupling structure between the open position and the closed position about a pivoting point, wherein the pivoting point is radially offset from the axial channel.

12. The optical fiber coupling device of claim 1, wherein the driver element is arranged around the axial channel.

13. The optical fiber coupling device of claim 1, wherein the main coupling structure comprises a first structure body and a second structure body removably attached or attachable to the first structure body, wherein the driver element is arranged or arrangeable on an external surface of the first structure body, and wherein a radial portion of the lid element, is axially arranged or arrangeable between the first structure body and the second structure body.

14. The optical fiber coupling device of claim 1, wherein the optical fiber coupling device further comprises:

a locking element for locking the optical fiber connector when the optical fiber connector is coupled to the coupling mechanism, wherein the locking element is configurable in a locked configuration, in which the locking element locks the optical fiber connector, and in an unlocked configuration, in which the locking element unlocks the optical fiber connector, wherein the driver element is coupled to the locking element such that, when the locking element is in the unlocked configuration, the driver element is in the first position and, when the locking element is in the locked configuration, the driver element is in the second position.

15. The optical fiber coupling device of claim 14, wherein the driver element is mechanically coupled to the locking element.

16. The optical fiber coupling device of claim 14, wherein the locking element is rotatable between the locked configuration and the unlocked configuration.

17. The optical fiber coupling device of claim 14, wherein the driver element comprises a mechanical actuator for mechanically operating the driver element and/or for mechanically coupling the driver element to the locking element.

18. The optical fiber coupling device of claim 1, wherein the optical fiber coupling device is an optical fiber collimator and comprises a collimating lens for collimating laser light transmitted from the optical fiber connector through the axial channel.

19. An optical fiber coupling device comprising:
a main coupling structure comprising:
an axial channel extending through the main coupling structure from a first axial end to a second axial end,
a coupling mechanism configured to couple an optical fiber connector thereto, wherein the coupling mechanism is axially arranged at the first axial end of the axial channel and configured such that, when an optical fiber connector is coupled thereto, light from the optical fiber connector can be transmitted through the axial channel; and
a lid mechanism configured to open and close the axial channel comprising:
a driver element arranged at least in part on an external side of the main coupling structure, wherein the driver element is movable between a first position and a second position; and
a lid element arranged at least in part within the main coupling structure and movably attached thereto, wherein the lid element is movable between a closed position, in which the lid element closes the axial channel, and an open position, in which the lid element exposes the axial channel,
wherein the lid element is magnetically coupled with the driver element such that, when the driver element is moved to the first position, the lid element follows a movement of the driver element to the open position driven by the driver element, and when the driver element is moved to the second position, the lid element follows a movement of the driver element to the closed position driven by the driver element; and
wherein an interior of the main coupling structure in which the lid element is arranged is isolated from the external side of the main coupling structure on which the driver element is arranged, such that there is substantially no fluid communication between an exterior of the main coupling structure and an interior of the main coupling structure other than through the axial channel.

20. An optical fiber coupling device comprising:
a main coupling structure comprising:
an axial channel extending through the main coupling structure from a first axial end to a second axial end, a coupling mechanism configured to couple an optical fiber connector thereto, wherein the coupling mechanism is axially arranged at the first axial end of the axial channel and configured such that, when an optical fiber connector is coupled thereto, light from the optical fiber connector can be transmitted through the axial channel; and a lid mechanism configured to open and close the axial channel comprising:

a driver element arranged at least in part on an external side of the main coupling structure, wherein the driver element is movable between a first position and a second position; and a lid element arranged at least in part within the main coupling structure and movably attached thereto, wherein the lid element is movable between a closed position, in which the lid element closes the axial channel, and an open position, in which the lid element exposes the axial channel, wherein the lid element is magnetically coupled with the driver element such that, when the driver element is moved to the first position, the lid element follows a movement of the driver element to the open position driven by the driver element, and when the driver element is moved to the second position, the lid element follows a movement of the driver element to the closed position driven by the driver element; and wherein the lid element is structurally independent from the driver element.

* * * * *